United States Patent [19]

Stein

[11] Patent Number: 4,880,843
[45] Date of Patent: Nov. 14, 1989

[54] COMPOSITION AND PROCESS FOR MAKING POROUS ARTICLES FROM ULTRA HIGH MOLECULAR WEIGHT POLYETHYLENE

[75] Inventor: Harvey L. Stein, Seabrook, Tex.

[73] Assignee: Hoechst Celanese Corporation, Somerville, N.J.

[21] Appl. No.: 173,988

[22] Filed: Mar. 28, 1988

[51] Int. Cl.$^4$ .......................... C08K 5/01; C08L 23/06
[52] U.S. Cl. ...................................... 521/98; 521/143; 521/919; 524/487; 524/489; 524/585; 264/126
[58] Field of Search .................. 521/98, 143; 524/487, 524/489, 585

[56] References Cited

U.S. PATENT DOCUMENTS

| | | | |
|---|---|---|---|
| 3,944,536 | 3/1976 | Lupton et al. | 264/331 |
| 3,954,927 | 5/1976 | Duling et al. | 264/49 |
| 4,237,037 | 12/1980 | Takahashi | 524/585 |
| 4,487,875 | 12/1984 | Nakajima | 524/585 |
| 4,588,633 | 5/1986 | Kono | 521/143 |

FOREIGN PATENT DOCUMENTS 0115192  8/1984  European Pat. Off. ............ 524/489

*Primary Examiner*—C. Warren Ivy
*Attorney, Agent, or Firm*—Perman & Green

[57] ABSTRACT

Porous shaped articles made from a molded composite of ultra high molecular weight polyethylene and polyethylene wax are disclosed. These articles are produced by free-sintering a non intensively mixed blend of UHMW-PE particles and particles of a polyethylene wax. The process involves mixing the UHMW-PE and wax both in powdered form until a heterogeneous mixture is formed, but under conditions which do not lead to any substantial fracturing of the UHMW-PE particles or melting of either component. The heterogeneous mix is then transferred to a press mold to form a shape and pressure is applied sufficient only to maintain the enclosed volume of the shape. The mold is heated to a temperature above the melting point of the UHMW-PE for a period of time to allow the particles to soften, expand, and contact one another at their surfaces. The mixture is then quickly cooled.

Porous articles so produced may exhibit stiffness values in excess of about 2000 psi while at the same time showing excellent porosity values of less than about 25 inches water pressure drop.

6 Claims, No Drawings

COMPOSITION AND PROCESS FOR MAKING POROUS ARTICLES FROM ULTRA HIGH MOLECULAR WEIGHT POLYETHYLENE

BACKGROUND OF THE INVENTION

The present invention relates to an ultra high molecular weight polyethylene composition particularly suited for making molded plastic articles of high strength and high porosity, to articles produced therefrom, and to process for their production.

Ultra high molecular weight polyethylene (UHMW-PE) is known in the art to process properties markedly superior to similar polyethylenes of lower molecular weight. Such properties include toughness, impact strength, abrasion resistance, anti-friction properties and resistance to corrosion and chemical attack. But because of its extremely high molecular weight (at least $10^6$) and the high viscosity of UHMW-PE melts, it is extremely difficult to process the material by conventional techniques such as injection molding, blow molding or screw extrusion. Such processing also may give rise to a degradation of he polymer chains with a consequential diminution of physical properties.

Porous sheets and articles made from polyethylene are known in the art. For example, U.S. Pat. No. 3,024,208 discloses a process for the production of porous polyethylene articles made by sintering (heating) of particles of polyethylene having a molecular weight of about 10,000 to 1,000,000 under heat and pressure without melting of the particles. U.S. Pat. No. 3,954,927 discloses a method for preparing porous articles comprising first forming a heterogeneous mixture of UHMW-PE particles with 50 to 95% by weight of a hydrocarbon such as mineral oil or a paraffin wax, heating the mixture of a temperature above the melting point of the hydrocarbon, forming the mixture into a shape, heating the shape to a second temperature above the melting point of the polyethylene until the polyethylene particles are completely fused, cooling the shape and then extracting the hydrocarbon to form the porous article. This extraction process leads to the formation of voids in the fused mass which creates porosity.

While these and similar processes offer the opportunity to minimize degradation of the polyethylene caused by conventional processing techniques as referred to above, it has been found that such porous articles are often brittle and easily fracturable, particularly when manufactured to give articles of higher porosity. Although low porosity articles may exhibit reasonably good stiffness, such low porosity articles are not suitable for many applications. Thus, there is a compromise of one property vs. the other. Accordingly, there is a continuing need to develop a process for producing porous articles made from UHMW-PE which offers better control of porosity while at the same time maintaining or improving the strength and flexibility of the article.

SUMMARY OF THE INVENTION

It has not been discovered that strong, flexible porous articles can be produced by free-sintering a non intensively mixed blend of UHMW-PE particles and particles of a polyethylene wax. The process involves mixing the UHMW-PE and wax both in powdered form until a uniform heterogeneous mixture is formed, but under conditions which do not lead to any substantial fracturing of the UHMW-PE particles or melting of either component. The uniform heterogeneous mix is then transferred to a press mold to form a shape and pressure is applied sufficient only to maintain the enclosed volume of the shape. The mold is heated to a temperature above the melting point of the UHMW-PE but below its degradation temperature for a period of time to allow the particles to soften, expand, and contact one another at their surfaces. The mixture is then quickly cooled.

Porous articles so produced may exhibit flexural stiffness values in excess of about 2,000 psi while at the same time showing excellent porosity values of less than about 25 inches water pressure drop, as defined hereinafter.

DETAILED DESCRIPTION OF THE INVENTION

The present invention provides a composition and process for producing molded porous articles of UHMW-PE having high porosity and good flexural strength. Such articles have utility as filter funnels, immersion filters, filter crucibles, porous sheets, pen tips, marker nibs, aerators, diffusers and light weight molded parts.

The UHMW-PE used in the present invention generally exhibits a molecular weight of at least $1 \times 10^6$, up to about $6 \times 10^6$ as determined by the intrinsic viscosity of a 0.05 weight percent solution in decahydronaphthalene at 135° C. in accordance with ASTM D-4020-81. Such polyethylenes may be produced by solution polymerization of ethylene using the well known coordination catalysts such as developed by Karl Ziegler.

Polyethylene waxes preferred for the purposes of this invention are commercially available materials exhibiting a melting point of at least about 100° C., preferably within the range of about 110° to 150° C., a density within the range of about 0.92 to about 0.99 g/cm$^3$ at 20° C., and a molecular weight in the range of about 1,000 to about 20,000, more preferably from about 2,000 to about 10,000. Most preferred are non-polar, non-oxidized waxes.

A molding composition is formed by dry blending particles of the UHMW-PE and particles of polyethylene wax in any suitable non-intensive mixing device for a period of time sufficient to form a uniform heterogeneous blend. This blending is conducted at a temperature well below the melting point of either component, preferably room temperature, and for a period of time sufficient to form a uniform blend of non-melted and non-softened particles. Suitable mixers include ribbon blenders, double cone mixers, drum tumblers, cement mixers, twin shell (Vee) mixers or similar devices. It is important that the mixing be non-intensive and be limited to a time required to form a uniform blend in order to avoid excessive heat generation and to avoid excessive fracturing of the particles.

Blend ratios of the components may range from about 40 to 95% by weight of the UHMW-PE and correspondingly about 5 to about 60% by weight of the polyethylene wax. Wax levels above about 60% by weight tend to give rise to molded articles of poor or nonexistent porosity, while at levels below about 5% by weight there is little increase or even a diminution of the flexural strength of the article produced from the blend. Preferred levels are at least about 10% wax up to about 50% wax, more preferably from about 15 to about 45% wax.

Molded articles may be formed by a free sintering process which involves introducing the UHMW-PE/Wax mixture into either a partially or totally confined space and subjecting the mixture to heat sufficient to melt the wax and cause the UHMW-PE particles to soften, expand and contact one another. Suitable processes include compression molding and casting. The mold is heated with a heated hydraulic press or infrared heaters to a temperature above the melting point of the UHMW-PE, generally in the range of about 175° C. to about 205° C.; more preferably in the range of about 185° C. to about 195° C. Heating time depends upon the mass of the mold, and lies generally within the range of about 5 to about 15 minutes. Subsequently, the mold is cooled and the porous article removed.

During the heating process, the wax component melts and tends to form agglomerates with the UHMW-PE particles. This permits the wax to fill particle interstitial spaces and surface irregularities. the UHMW-PE, on the other hand, softens and undergoes surface sintering and bonding with neighboring particles. Upon cooling, and as shrinkage occurs, larger void volumes are created in the UHMW-PE/Wax composite by changes in the wax morphology. The wax is further believed to act as a particle bonding agent giving rise to articles having greater flexibility and strength as compared with articles produced from UHMW-PE alone. Micro photographs of the cooled composite show that it is not a homogeneous blend of the polymer and wax, but rather comprises numerous agglomerates of UHMW-PE particles which are both surface-fused together and surround discrete particles or regions of the wax.

It has been found that the particle size distribution of the UHMW-PE particles used in the mixture is extremely influential upon the degree of porosity of the finished article. An excess of fine particles tends to fill the intricities or voids resulting in an article of lower porosity. An excess of larger particles tends to provide insufficient surface area for particle-to-particle contact during the sintering process. Preferably the UHMW-PE particles have a loose bulk density within the range of about 350 to 500 grams per liter as measured by ASTM D-1895 and a particle size distribution of at least about 95% through a 0.5 mm screen and not greater than about 15% through a 0.063 mm screen as measured by ASTM D-1921. The particle size distribution of the polyethylene wax is not necessarily critical, but the formation of a uniform heterogeneous mixture of the wax particles and the UHMW-PE particles is facilitated if the particle size distribution of each material approximate one another. The loose bulk density of the wax particles is preferably within the range of about 400 to 500 grams per liter.

In the following examples, various compositions are formulated and the porosity and stiffness values are reported.

Test samples are prepared by forming a 2½ inch diameter disc, one quarter inch thick, in a suitable mold. The mold is filled with the appropriate polymer and the sides are tapped to settle the powder for uniformity and to improve packing. The top of the mold is leveled, the mold is covered and inserted into a hydraulic press. The press is closed sufficiently to contact the mold with just enough pressure to maintain an enclosed volume. A temperature of about 190° C. is maintained on the press for a period of 12 minutes. The mold is then removed from the press and cooled quickly. The sample is removed from the mold and allowed to air cool for 24 hours.

The percent or degree of porosity is determined by placing the disc prepared as described above in an air chamber. The air chamber consists of a two section aluminum chamber six inches long and three and one quarter inches outside diameter. Internal dimensions are approximately four inches in length and two inches in diameter. The disc is inserted in a recessed area between the two chambers, and the chamber is then closed and sealed. Each section of the chamber is equipped with one quarter inch inlet and outlet taps for differential pressure (D.P) measurement in inches of water.

An air flow of 25 SCFH is then established and the differential pressure is determined with a manometer. This measurement of differential pressure is indicative of the degree of porosity of the specimen tested; the lower the differential pressure, the higher the porosity. From experience with this method, differential pressures of less than 25 inches water pressure drop are indicative of articles with excellent porosity.

Tinius-Olsen stiffness values of the various samples are measured in accordance with ASTM-D 747-84a.

This test method determines the apparent bending modulus of plastic materials by measuring force and angle of bend of a centilever beam. A free sintered specimen is clamped in a vise and a controlled load is applied to the free end. The vise is connected through gear trains to a motor and is capable of uniform clockwise rotation. It is provided with a pointer for indication of angular deflection. Rotation of the weighing system about the same point as the vise results due to movement of the blending plate. The magnitude of the movement is indicated with a pointer moving over a load scale.

The relationship of percent deflection vs load is determined on three (3) specimens, which are prepared in a mold equipped for eight (8) $1.5'' \times 0.25'' \times 0.125''$ specimens. Sintering procedure is identical to that described for the 2.5'' diameter disk. Load readings are taken at 3, 6, 9, 12, 15, 20, 25, and 30% deflection and the slope is calculated. Stiffness is determined by use of the equation:

$$E = \frac{4S_3}{wd} \times \frac{M \text{ (load scale reading)}}{100 \, \theta}$$

where
  E = Stiffness or Apparent Bending Modulus
  S = 0.25'', the distance between specimen mounting plate and bending surface
  w = 0.25'', specimen width
  d = 0.125'', specimen thickness
  M = 1.0 lbf-in, the total bending moment value on the pendulum system
  $\theta$ = reading of angular deflection scale in radians The following examples are illustrative of the invention.

EXAMPLES 1-9

Various blends were formed of UHMW-PE powder having a molecular weight of about $3 \times 10^6$ and polyethylene wax powder (Hostalger ® GUR UHMWPE and Hoechst Wax PE 190, both available from Hoechst Celanese Corporation) at various levels shown in Table 1. Both components had a particle size distribution of greater than 95% by weight through a 0.5 mm screen and less than 15% by weight through a 0.063 mm screen. The components were mixed for about 30 minutes at room temperature in a non-intensive blender. Test discs were prepared from each composition by the molding method described above. A control sample consisting of 100% of the UHMW-PE was also evaluated and designated as control A.

Porosity and T/O stiffness values were then obtained for each sample by the methods described above. Results are reported in Table 1.

TABLE 1

| % UHMW-PE | % WAX | T/O Stiffness, psi | Porosity, inches H$_2$O D.P. |
|---|---|---|---|
| Control A (100%) | — | 1886 | 18.1 |
| EX. 1   90% A | 10 | 1591 | 15.4 |
| EX. 2   80% A | 20 | 1842 | 9.3 |
| EX. 3   70% A | 30 | 2704 | 6.0 |
| EX. 4   60% A | 40 | 2978 | 5.4 |
| EX. 5   50% A | 50 | 3078 | 10.9 |
| EX. 6   40% A | 60 | 3006 | 24.5 |
| EX. 7   30% A | 70 | 3259 | No Air Flow |
| EX. 8   20% A | 80 | 16,014 | No Air Flow |
| EX. 9   10% A | 90 | 24,065 | No Air Flow |

As can be seen from the data in Table 1, a distinctive improvement in porosity was achieved at levels of polyethylene wax ranging from about 10 to up to about 60%, with an exhibition of a concomitant improvement of stiffness values of this particular batch of UHMW-PE beginning at wax levels between about 20 and 30% by weight.

EXAMPLES 10-14

Various blends were formed and processed as described in Examples 1-9 above using a different lot of UHMW-PE designated as Control B. Particle size distribution of the components in the blend were as described above. Porosity and stiffness values are as reported in Table 2.

TABLE 2

| % UHMW-PE | % WAX | T/O Stiffness, psi | Porosity, inches H$_2$O D.P. |
|---|---|---|---|
| Control B (100%) | — | 1488 | 43.8 |
| EX. 10   95% B | 5 | 1480 | 38.2 |
| EX. 11   90% B | 10 | 1969 | 37.2 |
| EX. 12   85% B | 15 | 2050 | 29.5 |
| EX. 13   80% B | 20 | 2145 | 25.9 |
| EX. 14   75% B | 25 | 2960 | 23.0 |

As demonstrated in Table 2, an improvement in stiffness value for this particular lot of UHMW-PE was demonstrated at a wax level somewhere between 5 and 10% with a consistent enhancement of porosity as the wax level was increased.

EXAMPLES 15-16

The UHMW-PE used in Examples 10-14 above (Control B) was blended with 25% by weight of Hoechst Wax PE-130 (Example 15) and 25% by weight of Hoechst Wax PE-520 (Example 16). Blending a molding was carried out as in Examples 1-9 and the particle size distribution of the materials was as specified in Examples 1-9. Porosity and stiffness values are as reported in Table 3.

TABLE 3

| % UHMW-PE | % WAX | T/O Stiffness, psi | Porosity, inches H$_2$O D.P. |
|---|---|---|---|
| Control A (100%) | — | 1488 | 43.8 |
| EX. 15   75% A | 25% | 3664 | 16.5 |
| EX. 16   75% A | 25% | 2308 | 11.5 |

Test results demonstrate a marked improvement in both stiffness values and porosity at a preferred 25% level of addition of the various waxes with this particular batch of UHMW-PE polymer.

EXAMPLE 17

This example illustrates the importance of the particle size distribution of the UHMW-PW polymer used in the manufacture of the porous articles of this invention. An UHMW-PE polymer having a bulk density of 399 g/l and having a particle fines fraction of 35.1% passing through a 0.063 mm screen was employed as Control C. This material was blended with 25% by weight of Hoechst PE 190 wax and processed as in Examples 1-9. Stiffness and porosity results are shown in Table 4.

TABLE 4

| % UHMW-PE | % WAX | T/O Stiffness, psi | Porosity inches H$_2$O D.P. |
|---|---|---|---|
| Control C (100%) | — | 1197 | 39.2 |
| EX. 17   75% | 25 | 2306 | 35.1 |

As demonstrated from the data of Table 4, there is an increase in stiffness of the UHMW-PE polymer at the 75/25 blend ratio, but very little increase in porosity which can be attributed to the high fines content of the UHMW-PE used in this test.

What I claim is:

1. A molding powder composition comprising a uniform heterogeneous mixture of particles of polyethylene having a molecular weight within the range of about $1 \times 10^6$ to about $6 \times 10^6$ as determined by the intrinsic viscosity of a 0.5 weight percent solution in decahydronaphthalene at 135° C., and particles of polyethylene wax having a molecular weight within the range of about 1,000 to about 20,000, the particle size distribution of said particles of polyethylene polymer being within the range of at least about 95% by weight smaller than 0.5 millimeters and not greater than about 15% by weight smaller than 0.063 millimeters.

2. The composition of claim 1 containing from about 40 to about 95% by weight of said polyethylene polymer and from about 5 to 60% by weight of said polyethylene wax.

3. The composition of claim 2 wherein said polyethylene wax has a molecular weight within the range of about 2,000 to about 10,000, and a melting point within the range of about 100° C. to about 150° C.

4. The composition of claim 3 wherein said polyethylene wax has a particle size distribution in the range of at least about 95% by weight of particles smaller than 0.5 millimeters and not greater than about 15% by weight smaller than 0.063 millimeters.

5. The composition of claim 2 containing from about 55 to 85% by weight of said polyethylene polymer and from about 15 to about 45% by weight of said polyethylene wax.

6. The composition of claim 5 containing about 75% by weight of said polyethylene polymer and about 25% by weight of said polyethylene wax.

* * * * *